United States Patent
Weinert et al.

(10) Patent No.: US 7,218,387 B2
(45) Date of Patent: May 15, 2007

(54) METHOD AND APPARATUS FOR PROVIDING VISUAL INFORMATION INDICATIVE OF TESTED FIBER OPTIC COMPONENT

(75) Inventors: Stephen J. Weinert, Arlington, TX (US); Michael L. Yeilding, Fremont, CA (US); Mary A. Cerniglia, Pleasanton, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 393 days.

(21) Appl. No.: 10/878,812

(22) Filed: Jun. 28, 2004

(65) Prior Publication Data

US 2005/0286043 A1    Dec. 29, 2005

(51) Int. Cl.
*G01N 21/00* (2006.01)
(52) U.S. Cl. .................................. 356/73.1
(58) Field of Classification Search .............. None
See application file for complete search history.

(56) References Cited

U.S. PATENT DOCUMENTS

| | | | |
|---|---|---|---|
| 4,726,676 A | 2/1988 | Maslaney et al. | |
| 4,797,556 A | 1/1989 | Marzari et al. | |
| 4,899,045 A | 2/1990 | Kramer | |
| 5,196,899 A | 3/1993 | Serwatka | |
| 5,530,546 A | 6/1996 | Barringer et al. | |
| 5,729,335 A | 3/1998 | Green | |
| 5,940,559 A | 8/1999 | Noll | |
| 6,177,985 B1 | 1/2001 | Bloom | |
| 6,392,746 B1 | 5/2002 | Buerli | |
| 6,454,464 B1 | 9/2002 | Nolan | |
| 6,590,642 B2 * | 7/2003 | Iida | 356/73.1 |
| 6,930,767 B2 * | 8/2005 | Su | 356/73.1 |
| 2003/0234973 A1 * | 12/2003 | Yamaguchi et al. | 359/334 |

* cited by examiner

*Primary Examiner*—Tu T. Nguyen
(74) *Attorney, Agent, or Firm*—Brooks Kushman P.C.

(57) ABSTRACT

A fiber optic component testing apparatus includes first and second transceiver devices respectively placed on proximal and distal ends of a fiber optic component. The first transceiver device transmits a visible light signal from an optical transmitter into the proximal end for the fiber optic component to conduct to the distal end. An optical reflector of the second transceiver device reflects the light signal at the distal end back towards the proximal end. A sensor of the first transceiver device monitors the light signal reflected by the optical reflector to determine whether a power level of the reflected light signal is greater than a given threshold. The sensor activates an indicator light to flash for a technician to view (and activates an indicator speaker for the technician to hear) when the power level of the reflected light signal is greater than the given threshold.

20 Claims, 1 Drawing Sheet

METHOD AND APPARATUS FOR PROVIDING VISUAL INFORMATION INDICATIVE OF TESTED FIBER OPTIC COMPONENT

BACKGROUND OF THE INVENTION

1. Field of the Invention

The present invention generally relates to testing fiber optic components and, more particularly, to a fiber optic component testing method and apparatus which provide visual information indicative of optical loss and continuity of a fiber optic component to technicians in a safe and protective environment. The present invention will permit the normal access and use by human activities using Network standards when working with potentially harmful light transmission sources.

2. Background Art

Technicians test fiber optic components (i.e., optical facilities) when placing the fiber optic components in given locations in order to ensure that the fiber optic components are functioning properly. Fiber optic components include fiber optic strands, jumpers, and cables. One way in which a technician tests a fiber optic component such as a fiber optic cable is by affixing an optical transmitter on the first end of the fiber optic cable. The technician then points the second end of the fiber optic cable towards a light reflectant object such as a piece of paper, the technician's hand, etc. The optical transmitter emits a signal of visible light into the first end of the fiber optic cable when the technician turns on the optical transmitter. The second end of the fiber optic cable emits the (attenuated) visible light after the visible light travels from the first end through the fiber optic cable. The visible light emitted from the second end of the fiber optic cable illuminates the paper, the technician's hand, etc., such that the technician is able to see the visible light emitted from the second end of the fiber optic cable. The technician then determines that the fiber optic cable is functioning properly upon seeing the visible light emitted from the second end of the fiber optic cable. That is, the technician determines that the fiber optic cable is functioning properly if the technician sees visible light emitted out from the second end of the fiber optic cable when the optical transmitter emits visible light into the first end of the fiber optic cable.

This testing practice is dangerous because it teaches technicians to indirectly visually observe light signals emitted from fiber optic components. As a result, technicians may determine that it is proper to visually observe light signals emitted from fiber optic components by directly looking with their eyes into the ends of fiber optic components in which the light signals are being emitted. This testing practice is also dangerous because it teaches technicians to point fiber optic components towards their hands, clothing, etc., and then have the light signals emitted from the fiber optic components radiate their body, clothing, etc.

Because visual light falls into the visible spectrum (400–700 nm), this testing practice gives technicians the false impression that all optical signals emitted from fiber optic components are visible and can be seen. A problem with this false impression is that telecommunication fiber optic components nominally transmit non-visible light signals during normal use instead of in the visual light spectrum. Non-visible (i.e., invisible) light signals fall outside of the light spectrum (400–700 nm) visible to the naked eye and, as a result, cannot be seen by the naked eye. If a fiber optic component is lit with an invisible signal while being tested by a technician using the visible light optical transmitter, then the technician would likely mistake the invisible signal for the "absence of light" and directly or indirectly view the light signals emitted from the light emitting end of the fiber optic component. A technician viewing invisible light signals emitted from a lit fiber optic component may be subjected to undue harm. Similarly, a technician pointing the emitting end of a lit fiber optic component on the technician's body, clothing, etc., such that the invisible light signals irradiate the technician's body, clothing, etc. may also be subjected to undue harm, especially with the new power levels of services being transmitted today.

DETAILED DESCRIPTION OF THE PREFERRED EMBODIMENT(S)

The advantages of the fiber optic component testing apparatus in accordance with the present invention are numerous. For instance, the fiber optic component testing apparatus provides a visual optical measurement validation device that follows protective and safety recommendations. The fiber optic component testing apparatus not only provides the continuity visualization, but from a safety perspective, also gives the actual measured loss of the overall service. This provides immediate information as to the suitability of fiber optic components to high-powered telecommunications optical signals before the fiber optic components are placed on optical facility routes. With use of the fiber optic component testing apparatus, testing can be performed at user premises, a telecommunications central office, or at two disparate locations (e.g., miles from one another).

The fiber optic component testing apparatus replaces fiber optic component and cable tests in which technicians visually observe actual light signals emitted out from fiber optic components, yet provides suitable protection from harmful laser/LED radiation. The use of the fiber optic component and cable testing apparatus supports the standards found in the International Electrotechnical Commission (IEC) and the American National Standards Institute (ANSI). The Occupational Health and Safety Administration has adopted the standards of the ANSI in regard to this testing.

Figure 1:
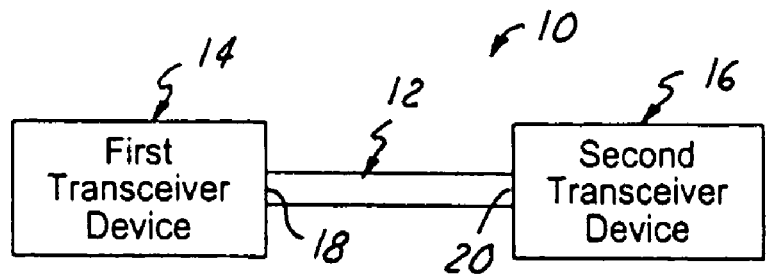
FIG. 1 illustrates a block diagram of a fiber optic component testing apparatus in accordance with the present invention.

Referring now to FIG. 1, a block diagram of a fiber optic component testing apparatus 10 in accordance with the present invention is shown. In general, a technician uses apparatus 10 to test a fiber optic component 12. Fiber optic component 12 is a component such as a fiber optic strand, a fiber optic jumper, a fiber optic cable, etc. Apparatus 10 is operable to test the optical loss and continuity of fiber optic component 12. Apparatus 10 is also operable to provide visual information indicative of the test results of fiber optic component 12 to the technician in a safe and protective environment. Apparatus 10 includes first and second transceiver devices 14 and 16 for testing the optical loss and continuity of fiber optic component 12 and for providing visual information indicative of the optical loss and continuity of the fiber optic component to the technician. In order to test fiber optic component 12 using apparatus 10, a technician places first transceiver device 14 on a proximal end 18 of fiber optic component 12 and places second transceiver device 16 on a distal end 20 of the fiber optic component.

In general, first transceiver device 14 emits a visible light signal into proximal end 18 of fiber optic component 12. The visible light signal has a given signal strength at proximal end 18. Fiber optic component 12 conducts the visible light signal from proximal end 18 to distal end 20. The visible light signal attenuates while being conducted through fiber optic component 12. Distal end 20 emits (an attenuated version of) the visible light signal. Second transceiver device 16 receives the attenuated visible light signal from distal end 20 of fiber optic component 12. Second transceiver device 16 measures the signal strength of the attenuated visible light signal received from distal end 20. The difference in the signal strengths of the visible light signal at proximal end 18 and distal end 20 of fiber optic component 12 is indicative of the optical loss of the fiber optic component. Likewise, second transceiver device 16 being able to receive the visible light signal conducted through fiber optic component 12 from proximal end 18 to distal end 20 with a signal strength meeting a given threshold is indicative of the continuity of the fiber optic component.

Figure 2:
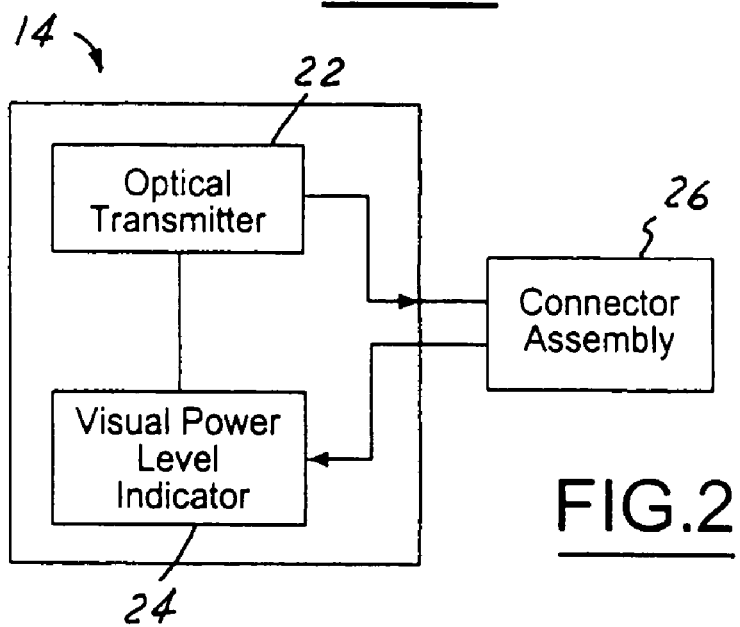
FIG. 2 illustrates a block diagram of the first transceiver device of the fiber optic component testing apparatus shown in FIG. 1.

Referring now to FIG. 2, with continual reference to FIG. 1, a block diagram of first transceiver device 14 is shown. First transceiver device 14 generally includes an optical transmitter 22, a visual power level indicator 24, and a connector assembly 26. Connector assembly 26 includes a plurality of different types of fiber optic component connectors (not shown). Each type of fiber optic component connector is operable to be connected to a corresponding fiber optic component type. Connector assembly 26 enables a technician to selectively choose from the types of fiber optic component connectors in order to properly place first transceiver device 14 on proximal end 18 of fiber optic component 12. The types of fiber optic component connectors provided by connector assembly 26 include, for example, SC-UPC, SC-APC, MU-APC, LC-UPC, and LX 1.5-UPC.

Optical transmitter 22 is operable to transmit light signals which are preferably visible (400–700 nm). Preferably, optical transmitter 22 transmits the visible light signals such that the visible light signals have a radiation power level of less than 9.6 mW (+9.8 dBm) for any emission greater than ten seconds. As such, optical transmitter 22 is preferably a class 2M laser (LED/LCD). When placed on proximal end 18 of fiber optic component 12 and then turned on, optical transmitter 22 emits a visible light signal into the fiber optic component.

Visual power level indicator 24 is operable to display visual information indicative of the status of optical transmitter 22 and the test results of fiber optic component 12 for a technician to view in a safe and protective environment. Such visual information includes information indicative of: the power output setting of optical transmitter 22; the power level of the visible light signal received by first transceiver device 14 after being reflected back from second transceiver device 16; and the actual power loss of the visible light signal through fiber optic component 12.

Regarding the power output setting of optical transmitter 22, visual power level indicator 24 is operable with the optical transmitter to receive a signal indicative of the power output setting of the optical transmitter. For example, if optical transmitter 22 is set to transmit a visible light signal having a signal strength of 3.0 mW into proximal end 18 of fiber optic component 12, visual power level indicator 24 generates the visual display "3.0 mW" as the power output setting of optical transmitter 22 for the technician to view.

Regarding the power level of the reflected visible light signal received by first transceiver device 14 from second transceiver device 16, the first transceiver device is operable with the second transceiver device to receive the visible light signal reflected back through fiber optic component 12 from the second transceiver device. To this end, visual power level indicator 24 may include an optical receiver (not shown) for receiving the visible light signal reflected back through fiber optic component 12 from second transceiver device 16. The reflected visible light signal is the visible light signal transmitted from optical transmitter 22 to second transceiver device 16 via the optical light path provided by fiber optic component 12 and then back to the first transceiver device from the second transceiver device via the same optical light path.

Typically, fiber optic component 12 has some sort of attenuation characteristics which attenuate visible light signals conducted through the fiber optic component. Accordingly, the signal strength of a reflected visible light signal received by first transceiver device 14 from second transceiver device 16 is lower than the signal strength of the visible light signal when transmitted from optical transmitter 22 to second transceiver device 16. For example, if the signal strength of the light signal transmitted from optical transmitter 22 is 3.0 mW, then the signal strength of the reflected light signal received by first transceiver device 14 back from second transceiver device 16 may be 1.0 mW. In this case, visible power level indicator 24 generates a visual display "1.0 mW" as the power level of the reflected visible light signal for the technician to view.

As indicated above, visible power level indicator 24 also provides a visual display of the actual power loss of the visible light signal through fiber optic component 12. Power loss of the visible light signal results from fiber optic component 12 attenuating the visible light signal. The actual power loss of the visible light signal can be measured from the difference between the signal strength of the visible light signal transmitted from optical transmitter 22 and the signal strength of the reflected visible light signal received by first transceiver device 14 from second transceiver device 16.

From the example above, the signal strength of the visible light signal transmitted by optical transmitter 22 is 3.0 mW. The signal strength of the reflected visible light signal received by first transceiver device 14 from second transceiver device 16 is 1.0 mW. As such, the actual power loss of the visible light signal through and back through fiber optic component 12 is 2.0 mW (i.e., 3.0 mW–1.0 mW). That is, the actual power loss of a 3.0 mW visible light signal transmitted from proximal end 18 to distal end 20 via fiber optic component 12 and back to the proximal end via the fiber optic component is 2.0 mW. Accordingly, the actual power loss of the visible light signal from proximal end 18 to distal end 20 is one-half of the actual power loss through forward and return paths of fiber optic component 12. In this case, the actual power loss through one path of fiber optic component 12 is 1.0 mW (i.e., ½*2.0 mW). In this case, visual power level indicator 24 generates the visual display of "1.0 mW" as the actual power loss through one path of fiber optic component 12 for the technician to view.

Figure 3:
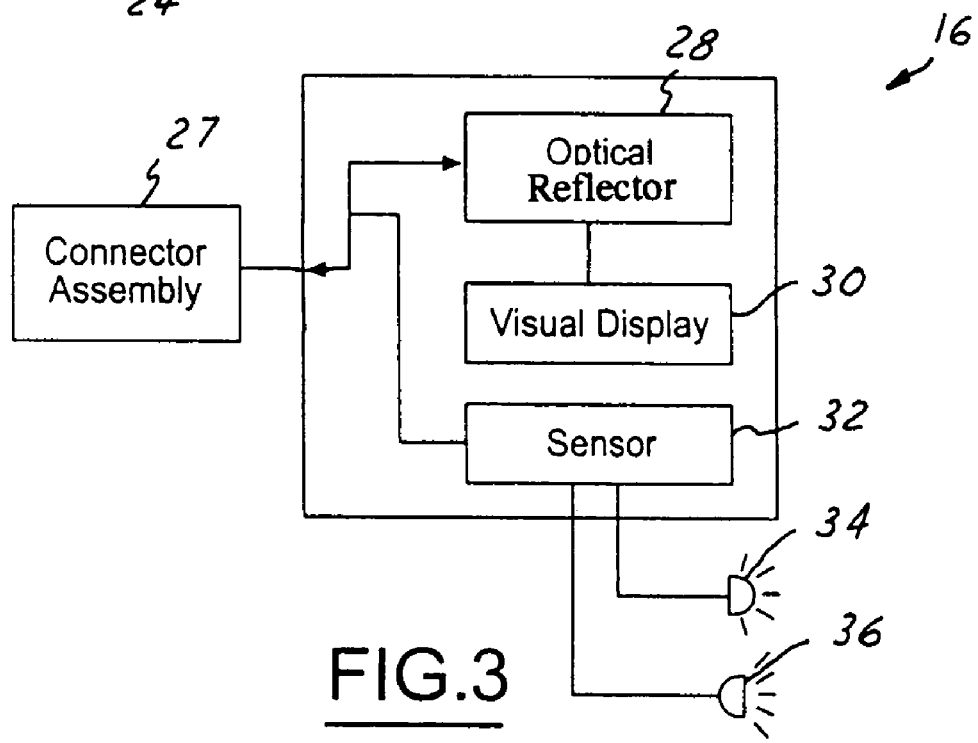
FIG. 3 illustrates a block diagram of the second transceiver device of the fiber optic component testing apparatus shown in FIG. 2.

Referring now to FIG. 3, with continual reference to FIGS. 1 and 2, a block diagram of second transceiver device 16 is shown. Second transceiver device 16 also includes a connector assembly 27 having connectors for placing the second transceiver device on distal end 20 of fiber optic component 12. Second transceiver device 16 further includes an optical reflector 28, a visual display 30, and a sensor 32. Optical reflector 28 provides a light reflectant at distal end 20 of fiber optic component 12. Optical reflector 28 reflects the visible light signal transmitted by optical transmitter 22 of first transceiver device 14 through fiber optic component 12 back through the fiber optic component to the first transceiver device.

Visual display 30 is operable with optical reflector 28 to provide a visual display to the technician indicative of the power level or the signal strength of the visible light signal received by second transceiver device 16 from first transceiver device 14. From the example given above, the power level of visible light signal transmitted from optical transmitter 22 is 3.0 mW and the power loss is 1.0 mW through one path of fiber optic component 12. Hence, the power level of the visible light signal received by optical reflector 28 from optical transmitter 22 is 2.0 mW (3.0 mW–1.0 mW). Accordingly, visual display 30 generates a visual display of "2.0 mW" as the power level of the visible light signal received by second transceiver device 16 from first transceiver device 14 for the technician to view.

Sensor 32 monitors for light signals reflected by optical reflector 28 back through fiber optic component 12 to first transceiver device 14. As such, sensor 32 monitors for the visible light signal reflected by optical reflector 28. Preferably, sensor 32 monitors for reflected cohesive light signals having a signal strength of at least −15 dBm. Sensor 32 includes an LED/LCD 34 having a battery or portable powered source. Upon detecting a reflected light signal having a signal strength of at least −15 dBm, sensor 32 activates the battery to cause LED/LCD 34 to flash on-and-off for the technician to visually detect. The flashing LED/LCD 34 indicates to the technician the presence of a "live" optical signal. In the example given above, the signal strength of the visible light signal reflected by optical reflector 28 is 2.0 mW. Accordingly, in this example, sensor 32 would activate the battery to cause LED/LCD 34 to flash using a low-power, non-harmful visible light.

A reflected light signal having a signal strength of at least −15 dBm implies that fiber optic component 12 has continuity. Hence, a flashing LED/LCD 34 visually implies to technicians that fiber optic component 12 has continuity.

Sensor 32 may further include a speaker 36 having a battery or portable powered source. Upon detecting a reflected cohesive light signal having a signal strength of at least −15 dBm, sensor 32 likewise activates the battery to cause speaker 36 to emit a "siren" type of sound for the technician to audibly detect. Hence, an audible speaker 36 audibly implies to technicians that fiber optic component 12 has continuity.

It is to be appreciated that second transceiver device 16 can be used in a stand-alone mode as well as a terminator that identifies a telecommunications laser that begins transmitting through fiber optic component 12. Second transceiver device 16 identifies the presence of the visible light signal and its power, yet visually displays information indicative of the visible light signal in a manner which is safe to technicians by not exposing the technicians to the actual transmitted optical signal or potential hazardous laser/LED radiation.

Preferably, first and second transceiver devices 14, 16 are survivable in a Hazard Level 4 environment for a prolonged period in excess of twenty-four hours. First and second transceiver devices 14, 16 are able to be used on an indefinite period for Hazard Level 3b or less levels.

As described, fiber optic component testing apparatus 10 provides a visual optical measurement validation device that follows protective and safety recommendations. Second transceiver device 16 not only measures the visible light signal received through fiber optic component 12 from first transceiver device 14, but also translates a measured coherent beam into an electronic signal that provides a low amperage pulse to LED/LCD 34 that may be viewed by the naked eye without the need for any protection devices. Optical transmitter 22 and optical reflector 28 are measured against each other to report the actual measured power loss from end-to-end 18, 20 of fiber optic component 12. As such, fiber optic component testing apparatus 10 provides a rapid method of determining if there are aberrations in the connectivity or terminations in the light path provided by the fiber optic component.

Thus, it is apparent that there has been provided, in accordance with the present invention, a fiber optic component testing method and apparatus which provide visual information indicative of optical loss and continuity of a fiber optic component to technicians in a safe and protective environment that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An apparatus for testing a fiber optic component, the apparatus comprising:
   a first device having a first connector assembly and an optical transmitter, the first connector assembly having different types of connectors each being operable to connect the first device to a proximal end of a corresponding type of fiber optic component, wherein the optical transmitter transmits a light signal into the proximal end of a fiber optic component when the first device is connected to the proximal end of the fiber optic component; and
   a second device having a second connector assembly, an optical reflector, a sensor, and an indicator light, the second connector assembly having different types of connectors each being operable to connect the second device to a distal end of a corresponding type of fiber optic component, wherein the optical reflector reflects the light signal at the distal end of the fiber optic component back towards the proximal end of the fiber optic component and the sensor monitors signal strength of the reflected light signal at the distal end of the fiber optic component when the second device is connected to the distal end of the fiber optic component, wherein the sensor activates the indicator light to flash for a technician to visually detect when the signal strength of the reflected light signal at the distal end of the fiber optic component is greater than a given threshold.

2. The apparatus of claim 1 wherein:
   the second device further includes an indicator speaker, wherein the sensor activates the indicator speaker to emit sound for a technician to audibly detect when the signal strength of the reflected light signal at the distal end of the fiber optic component is greater than the given threshold.

3. The apparatus of claim 1 wherein:
the light signal is a visible light signal having a wavelength falling within the range of 400 nm to 700 nm.

4. The apparatus of claim 3 wherein:
the optical transmitter of the first device transmits the visible light signal such that the visible light signal has a signal strength at the proximal end of the fiber optic component of less than 9.6 mW for any transmission greater than ten seconds.

5. The apparatus of claim 1 wherein:
the first device further includes a visual power level indicator, wherein the first device determines signal strength of the light signal at the proximal end of the fiber optic component and the visual power level generates a visual display indicative of the signal strength of the light signal at the proximal end of the fiber optic component for the technician to view.

6. The apparatus of claim 5 wherein:
the first device determines signal strength of the light signal reflected from the distal end of the fiber optic component back to the proximal end of the fiber optic component, wherein the visual power level indicator generates a visual display indicative of the signal strength of the reflected light signal at the proximal end of the fiber optic component for the technician to view.

7. The apparatus of claim 6 wherein:
the first device determines power loss of the light signal as a function of the signal strength of the light signal at the proximal end of the fiber optic component and the signal strength of the reflected light signal, wherein the visual power level indicator generates a visual display indicative of the power loss of the light signal for the technician to view.

8. The apparatus of claim 1 wherein:
the second device includes a visual display, wherein the second device determines the signal strength of the light signal at the distal end of the fiber optic component and the visual display displays the signal strength of the light signal at the distal end of the fiber optic component for the technician to view.

9. An apparatus for testing a fiber optic component, the apparatus comprising:
a first transceiver device placed on a proximal end of a fiber optic component, the first transceiver device having an optical transmitter, wherein the optical transmitter transmits a visible light signal into the proximal end of the fiber optic component for the fiber optic component to conduct to a distal end of the fiber optic component while the first transceiver device is placed on the proximal end of the fiber optic component; and
a second transceiver device having a second connector assembly having different types of connectors each being operable to place the second transceiver device on the distal end of a corresponding type of fiber optic component, the second transceiver device having an optical reflector, a sensor, and an indicator light, wherein while the second transceiver device is placed on the distal end of the fiber optic component the optical reflector reflects the light signal at the distal end of the fiber optic component back towards the proximal end of the fiber optic component and the sensor monitors the light signal reflected by the optical reflector to determine whether a power level of the reflected light signal is greater than a given threshold, wherein the sensor activates the indicator light to flash for a technician to view when the power level of the reflected light signal is greater than the given threshold.

10. The apparatus of claim 9 wherein:
the second transceiver device further includes an indicator speaker, wherein the sensor activates the indicator speaker for the technician to hear when the power level of the reflected light signal is greater than the given threshold.

11. The apparatus of claim 9 wherein:
the first transceiver device further includes a power level indicator, wherein the power level indicator visually displays the power level of the light signal transmitted by the optical transmitter at the proximal end of the fiber optic component for the technician to view.

12. The apparatus of claim 11 wherein:
the first transceiver device determines the power level of the reflected light signal at the proximal end of the fiber optic component, wherein the power level indicator visually displays the power level of the reflected light signal at the proximal end of the fiber optic component for the technician to view.

13. The apparatus of claim 12 wherein:
the first transceiver device determines power loss of the light signal based on differences between the power level of the light signal transmitted by the optical transmitter at the proximal end of the fiber optic component and the power level of the reflected light signal at the distal end of the fiber optic component, wherein the power level indicator visually displays the power loss of the light signal for the technician to view.

14. The apparatus of claim 10 wherein:
the sensor of the second transceiver device determines the power level of the light signal reflected by the optical reflector, wherein the second transceiver device further includes a visual display which is operable with the sensor to visually display the power level of the light signal reflected by the optical reflector for the technician to view.

15. The apparatus of claim 9 wherein:
the first transceiver device further has a first connector assembly having different types of connectors each being operable to place the first transceiver device on a proximal end of a corresponding type of fiber optic component.

16. A method for testing a fiber optic component, the method comprising:
placing a first transceiver device, having a first connector assembly having different types of connectors each being operable to place the first transceiver device on a proximal end of a corresponding type of fiber optic component, on the proximal end of a fiber optic component by selectively choosing a connector of the first connector assembly which is operable to place the first transceiver device on the proximal end of the fiber optic component;
the first transceiver device transmitting a visible light signal into the proximal end of the fiber optic component for the fiber optic component to conduct from the proximal end to a distal end of the fiber optic component while the first transceiver device is placed on the proximal end of the fiber optic component;
placing a second transceiver device, having a second connector assembly having different types of connectors each being operable to place the second transceiver device on a distal end of a corresponding type of fiber optic component, on the distal end of the fiber optic component by selectively choosing a connector of the second connector assembly which is operable to place the second transceiver device on the distal end of the fiber optic component;

the second transceiver device reflecting the light signal at the distal end of the fiber optic component for the fiber optic component to conduct back to the proximal end while the second transceiver device is placed on the distal end of the fiber optic component;

monitoring the light signal reflected at the distal end of the fiber optic component to determine whether the reflected light signal has a signal strength greater than a given threshold; and flashing an indicator light of the second transceiver device for a technician to view while the reflected light signal has a signal strength greater than the given threshold.

17. The method of claim 16 further comprising:

visually displaying at the first transceiver device the power level of the light signal transmitted by the first transceiver device for the technician to view.

18. The method of claim 17 further comprising:

determining the power level of the reflected light signal; and visually displaying at the second transceiver device the power level of the reflected light signal for the technician to view.

19. The method of claim 18 further comprising:

determining power loss of the light signal based on differences between the power level of the light signal transmitted by the first transceiver device at the proximal end of the fiber optic component and the power level of the reflected light signal; and visually displaying the power loss of the light signal at the first transceiver device for the technician to view.

20. The method of claim 16 further comprising:

activating a speaker of the second transceiver device for the technician to hear while the reflected light signal has a signal strength greater than the given threshold.

* * * * *